(12) United States Patent
Miller

(10) Patent No.: US 6,373,614 B1
(45) Date of Patent: Apr. 16, 2002

(54) HIGH PERFORMANCE POLARIZATION CONTROLLER AND POLARIZATION SENSOR

(75) Inventor: Peter J. Miller, Newburyport, MA (US)

(73) Assignee: Cambridge Research Instrumentation Inc., Boston, MA (US)

(*) Notice: Subject to any disclaimer, the term of this patent is extended or adjusted under 35 U.S.C. 154(b) by 0 days.

(21) Appl. No.: 09/652,702

(22) Filed: Aug. 31, 2000

(51) Int. Cl.[7] .................. G02F 1/00; G02F 1/07; G01J 4/00; G01J 1/20
(52) U.S. Cl. .............. 359/237; 359/192; 359/250; 359/499; 359/256; 359/249; 359/618; 356/367; 356/489; 250/201.1; 349/9; 348/751
(58) Field of Search .................. 359/237, 250, 359/254, 316, 192, 245, 246, 249, 256, 583, 618, 499, 500, 485; 356/367, 489, 495; 349/5, 9, 193; 250/201.1; 348/751, 757

(56) References Cited

U.S. PATENT DOCUMENTS

| 4,071,751 | A | * | 1/1978 | Waksberg | 250/201.1 |
| 4,597,640 | A | * | 7/1986 | Buhrer | 359/499 |
| 4,681,450 | A | | 7/1987 | Azzam et al. | 356/367 |
| 4,725,145 | A | | 2/1988 | Azzam et al. | 356/367 |
| 4,848,877 | A | | 7/1989 | Miller | 349/184 |
| 4,979,235 | A | | 12/1990 | Rumbaugh et al. | 359/192 |
| 5,005,952 | A | | 4/1991 | Clark | 349/193 |
| 5,005,977 | A | * | 4/1991 | Tomoff | 356/367 |
| 5,440,414 | A | * | 8/1995 | Kersey et al. | 359/250 |

OTHER PUBLICATIONS

Takafumi Chiba et al., *Journal of Lightwave Technology*, vol. 17, No. 5, May 1989, pp. 885–890.

* cited by examiner

Primary Examiner—Loha Ben
(74) Attorney, Agent, or Firm—Cohen, Pontani, Lieberman & Pavane

(57) ABSTRACT

The invention is an instrument for sensing the state of polarization (SOP), and for transforming the SOP of a beam of light from an incident continuously-varying arbitrary SOP to a desired exit SOP, using a polarization compensator under feedback control. A polarization sensor uses two or three samples of a beam to sense the Poincare sphere latitude and longitude error in SOP. A polarization controller adjusts the SOP of light, which is then sensed by the polarization sensor, which develops signals to drive the polarization compensator using feedback methods. Unlike prior-art systems, the feedback seeks a mid-point rather than an extremum in the sensed signals, so there is no sign ambiguity in the feedback control. Further, the sensor signals indicate orthogonal displacements in SOP that correspond to specific elements in the polarization controller, so there is no ambiguity as to which element needs adjustment in order to correct a given error in SOP. The result is a high-performance instrument with high-speed response to changes in the SOP of the incident beam, and very low error in the exit SOP.

53 Claims, 8 Drawing Sheets

HIGH PERFORMANCE POLARIZATION CONTROLLER AND POLARIZATION SENSOR

FIELD OF THE INVENTION

The invention relates to sensing and control of polarization in optical beams using feedback, and to optical telecommunication systems where control of polarization and of polarization mode dispersion are important.

BACKGROUND OF THE INVENTION

It is routine to measure polarization by means of serial measurements of intensity while a polarization sensitive element such as a waveplate or polarizer is mechanically rotated, or engaged and disengaged from the beam. Electro-optic approaches are used, where variable retarders such as pockels cells, Kerr cells, liquid crystal cells, optical rotators, and the like are driven to different settings while the beam is analyzed at a fixed polarizer or other element. The mechanical systems are unwieldy, and the electro-optic systems are costly; both are inherently slow and vulnerable to time-fluctuations in the beam being measured since they employ serial measurements of intensity.

Other approaches are possible, such as the use of two detectors at the outputs of a Wollaston prism. This is rugged and provides rapid information about the state of polarization (SOP) of a beam, but the information is incomplete, being typically limited to at most two of the four Stokes parameters. The cost of a Wollaston prism or similar displacing element is considerable, another problem with this approach.

Azzam teaches in U.S. Pat. No. 4,681,450 an apparatus for sensing polarization of a monochromatic beam, based on several photodiodes in a three-dimensional configuration that reflects light from a first detector onto a second detector and finally onto a third. The reflections are at significantly non-normal incidence, and the detectors have polarization-dependent reflection coefficients, which enable calculation of the incident SOP from the three detector readings. The apparatus is dependent on the surface properties of the detectors, and often requires calibration of each instrument. Further, it is only suitable for use over a limited range of wavelengths, since the reflection coefficients are wavelength-dependent. Finally, the configuration of several detectors is awkward to construct and costly to package, compared to simple mounting of detectors on a printed-circuit board or the like. These factors all vitiate against low cost in a mass-production fashion. The alternative arrangement of Azzam in U.S. Pat. No. 4,725,145 requires fewer photodetectors (only one or two, rather than four) but they must be mechanically rotated to derive the state of polarization.

In short, all prior-art method for sensing SOP suffer one or more of the following limitations: high cost, slow speed, mechanical moving parts, incomplete information about the SOP, need for calibration, critical dependence on detector reflection properties, and inability to sense SOP for a polychromatic beam. There is at present no rugged and economical means for sensing complete SOP information.

Turning to polarization control, Clark teaches a polarization controller in U.S. Pat. No. 5,005,952, based on a stack of multiple liquid crystal variable-retarder cells controlled by means of a feedback signal. He further teaches means for transforming a continuously varying SOP to a fixed linear state by use of four such cells, or by a pair of three-cell stacks with switching means to direct the incident beam to one or another of the stacks.

Rumbaugh et. al. teach a polarization controller in U.S. Pat. No. 4,979,235, based on a stack of three liquid crystal variable-retarder cells. He further discloses a method for generating a continuously-varying SOP from a fixed linear SOP using only a single three-cell stack with no switching means. The method is based on optimizing the output of a homodyne detector by noting the change in output while the drive signal is adjusted in a certain sense for each of two liquid crystal cells, one after the other. The detector output is monitored after each adjustment, and the sense of adjustment is reversed in subsequent loop iterations for a given cell if the previous adjustment decreased the detector output. Thus, if the first adjustment to a given cell has the wrong sense to produce the desired SOP, a total of four adjustments are required—two adjustments to each of the two cells-before the feedback begins to be beneficial.

This complicated and unwieldy control method is inherent in such a system where there is only one feedback signal from which adjustment of two cells must be derived. And, since the signal attains a local maximum at the desired operating point, the feedback sense changes from negative (stable) to positive (unstable) when the controller passes through the optimum response. An equivalent situation occurs if the signal attains a local minimum at the desired operating point. Overall, the servo action is not deterministic, but works by trial-and-error 'hunting': it hunts to determine which retarder needs adjustment, and it hunts to determine whether an increase or decrease in retardance is needed.

Miller teaches feedback control of a liquid crystal variable retarder in U.S. Pat. No. 4,848,877, based on an optical signal passing through the retarder.

Various prior-art references describe the use of mechanical means to adjust the SOP of light in an optical fiber by squeezing the fiber. Firms supplying such equipment commercially include Oz Optics (Carp, Ontario, Canada), Fiber-Pro (Taejon, Korea), and Optics For Research (Caldwell, N.J.).

Systems for SOP compensation and control of have been proposed based on the opto-ceramic materials sold by NZ Applied Technologies (Woburn, Mass.).

Dithering systems of various kinds are known for maximizing signals which have a periodic sinusoidal (or similar) dependence on a control variable. Some dither the control at a frequency $F_d$ which is faster than the servo response of the system $F_s$, and look for a minimum in the envelope of response at $F_d$, which indicates that the flat top of the periodic response has been attained; or, they monitor the envelope of response at frequency $2F_d$ and seek a maximum, or combinations of these themes and variations upon them. However, these methods cannot be exploited when the control element has inherently slow time response and cannot be dithered at or above the servo response frequency.

Thus while various methods have been shown for polarization control, or for control of liquid crystal variable retarders, none provides for deterministic servo control that is free from hunting, nor that produces a stable output with rapid time response to changes in the input SOP, and that exhibits low output error. It is the aim of the present invention to provide these capabilities. It is further an aim to provide this in a controller with only three variable retarder stages, which nonetheless has the capacity to transform a continuously-variable SOP to a desired state. It is yet a further aim of this invention to provide a control action that is robust in the face of intensity changes in the incident beam, and to achieve a high optical efficiency or throughput.

SUMMARY OF THE INVENTION

The invention consists of an apparatus that samples the SOP of a beam, that may optionally be placed in series with a polarization compensator to sample the SOP of the compensated beam. The compensator may be built using any type of control element, including liquid crystal cells, fiber optic squeezers, opto-ceramic modulators, lithium niobate modulators, or any other device which acts as a polarization compensator. In a preferred embodiment, the compensator comprises three retarders that transform incident light with a continuously-varying SOP to be linearly polarized along a specified polarization axis. The first and third variable retarder have their fast or slow axes oriented at 45° to the exit polarization axis, to which either the fast or slow axis of the middle variable retarder is parallel. The middle variable retarder may be constructed as two liquid crystal cells with parallel (or perpendicular) slow axes, so they act in concert as a single retarder whose retardance is the sum (or difference) of their individual retardances.

The SOP sampling apparatus uses retarders and polarization-sensitive beamsplitters that direct light towards two or three photodetectors. The detectors may be operated at normal incidence, and need not have any special polarization sensitivity in their response. Often, the desired SOP is a linearly polarized state, which is represented by a point on the equator of the Poincare sphere; we define the co-ordinate system of the sphere so this location has a longitude of 0° and corresponds to horizontally polarized light. The SOP may be sampled by assembling in series the following elements: a quarter wave plate with its axis at 45°, a beamsplitter, a half-wave plate with its axis at 22.5°, a second beamsplitter, and a quarterwave plate with its axis at 45°.

The beamsplitters produce sample beams whose intensities indicate the Poincare latitude and longitude, respectively, of the SOP produced by the polarization controller. These signals preferably are orthogonal in the sense that a change in latitude does not alter the longitude signal, and vice versa. They are preferably monotonic functions of latitude or longitude for output SOPs near the desired SOP. The ability to sense not only the presence of a deviation from a desired SOP, but the magnitude and vector direction of the deviation, is of great benefit in polarization control and in systems for control of polarization mode dispersion.

When the SOP sensor is used together with a polarization compensator, the latter apparatus is preferably designed so that one variable retarder adjusts the Poincare latitude, and another variable retarder adjusts Poincare longitude, or an equivalent arrangement. The action of the retarders is thus orthogonal and there is a one-to-one correspondence between a specific parameter measured by the SOP sensor, and a control element in the polarization compensator which adjusts that specific parameter. Errors in the sensed longitude may be corrected by adjusting the compensator element that adjusts longitude, and similarly for latitude. Servo control of the SOP is readily achieved by the use of independent control circuitry for each of these parameters. Further, since the beamsplitter signals can be made monotonic in the neighborhood of the desired SOP, there is no sign ambiguity in the sense of feedback, so there is no hunting.

It is possible to achieve a small-signal servo gain-bandwidth of several hundred Hz or more using liquid crystal variable retarders to control light at 1.55 $\mu$. This is at least 10× faster than is achieved using the method of Rumbaugh with the same liquid crystal retarders. The increase is due to five factors. First is the use of two beamsplitter signals keyed to which retarder needs adjustment. This provides a speed advantage over prior-art systems, which have only a single signal and must try adjusting two retarders in time-sequence to determine which one actually needed adjustment.

Second, the fact that these signals vary in a monotonic fashion provides a speed advantage over prior-art systems which provided a control signal having a local maximum or minimum at the desired SOP. In prior-art systems the function describing signal intensity versus retarder setting changes sign at the desired SOP, so the feedback sense constantly changes from negative (stable) to positive (runaway error) during operation. Control errors are frequent, and the system response must be tested after every adjustment, to see whether or not the feedback sense has changed since the last adjustment. The provision of signals that vary in a monotonic fashion with output SOP eliminates these control errors and eliminates the need for testing for feedback sense after each adjustment.

Third, the present system provides a signal that is linear for modest excursions in SOP. In contrast, prior art systems tend to seek an extremum such as a signal maximum or minimum. In the vicinity of the desired SOP, the slope of the response curve is actually zero. Small excursions produce a disproportionately small signal from the SOP sensor, making it very difficult to produce a system with low SOP error. In contrast, the present invention produces a signal that is linear with SOP excursion in the neighborhood of the desired SOP. Construction of low-error systems is greatly facilitated as a result. Further, the nonlinear prior-art systems degrade the speed of response when used in a servo system, since the effective gain of the system varies with the sensitivity of the SOP sensor.

Fourth, servo control in the present invention can be continuous in time, rather than discrete in time. Prior-art systems required discrete-time control in order to isolate which retarder needed adjustment, and in what sense. Sufficient time had to be provided after each adjustment so that the effect of previous adjustments was substantially complete, and did not confound the determination at hand.

Fifth, prior-art systems using discrete time control needed to operate at relatively slow sample rates. While modern control and state-space control theory provide for discrete-time control at sample rates exceeding twice the natural response frequency of the system being controlled, liquid crystal retarders do not meet the criteria for using such techniques. In addition to being nonlinear in response, their time-response is different (by up to 10×) for increases in drive level versus decreases in drive level. This effect is most pronounced for large excursions, which in turn are most prevalent when there is large servo error due to servo hunting. In practice, prior-art systems we built could only be successfully operated at the slower of the two rates (increases vs. decreases in drive).

The present invention eliminates this speed penalty, along with the need for discrete-time control, and the need to adjust two retarders in time-sequence, and the need to try adjustments in both senses to correct an error in output SOP, and the need to allow for the nonlinear response of the SOP sensor, and thereby achieves an overall speed gain of 10× or more compared with the prior art.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the following figures, like numbers are used to designate the same element in the various drawings.

DETAILED DESCRIPTION OF THE PRESENTLY PREFERRED EMBODIMENTS

Figure 1:
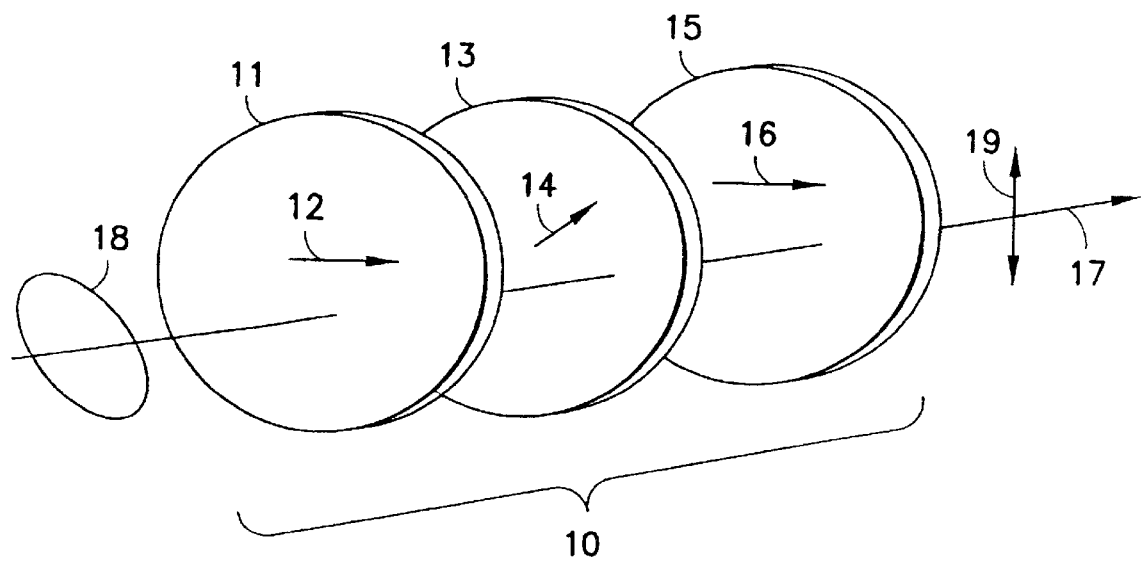
FIG. 1 shows a polarization compensator 10 consisting of three retarders, comprising retarder 11 with fast axis 12, retarder 13 with fast axis 14, and retarder 15 with fast axis 16. Light beam 17 enters the stack with an arbitrary SOP indicated by 18, and exits the stack with an SOP that is linearly polarized along axis 19.

Throughout the discussion of the invention, repeated reference is made to optical retarders, polarization-sensitive beamsplitters, and polarization compensators, for which suitable sources, construction, and materials are now set forth.

The retarders may be constructed of stretched plastic films such as polyvinyl alcohol (PVA), polycarbonate, polyethylene terapthelate (Mylar), and the like, which are sold commercially for use in displays and optical systems. Vendors include Polaroid (Norwood, MA), Sanritz (San Jose, Calif.), Nitto Denko (Fremont, Calif.), and International Polarizer (Marlboro, Mass.). Inorganic materials such as quartz, lithium niobate, calcite, mica, $CaF_2$ may be used and are available from optics suppliers such as Karl Lambrecht (Chicago Ill.), Meadowlark Optics (Longmont Colo.), or VLOC (Port Richey, Fla.). Often, these have more retardance than is required or indeed desirable; consequently one often resorts to using a pair of elements with slightly different thicknesses oriented with crossed axes. Though possible, this is costly and bulky. These materials, especially quartz, do offer the benefit of UV operation. Another alternative is to use oriented liquid crystal polymers, photo-oriented polymers, or a combination, as has been described by Rolic. In summary, one may use any other material which achieves the desired retardance, and for operation in the visible and near-infrared there is no dearth of materials.

The retarders may be constructed as achromatic retarders, in which case the associated apparatus for sensing SOP is essentially achromatic. Achromatic retarders may be purchased commercially from Meadowlark Optics (Longmont, Colo.) or may be built from individual retarder sheets using the designs known in the art and described in publications by Title, Harris, and others. The choice to use achromatic vs. simple retarders will be guided by the wavelength range over which the apparatus will be used, and the degree of accuracy that is sought.

The orientation of a waveplate is variously specified in the literature by describing the orientation of either the fast or slow axis, the two being orthogonal to one another. Throughout this description, whenever the retarder axis is specified, that is the orientation of the fast axis, not the slow axis.

Polarization-sensitive beamsplitters are used to sample a small portion of the flux in a main beam, from which they form a distinct sample beam that may be monitored or read at a detector. Such a beamsplitter is polarization-sensitive when it preferentially samples one polarization state over the other. This selective removal of light in one polarization state means that it acts, necessarily, as a weak polarizer of the main beam. However, this effect should be minimized through component selection, so it does not make a significant change to the polarization state of the main beam. Thus one should not use a so-called polarizing beamsplitter, which are used for removing substantially all of one polarization component from a beam by reflection, while transmitting substantially all of the orthogonal polarization component. The function of the beamsplitting element in the present invention is, rather, to produce a sample beam that indicates the relative proportion of S- or P-light without greatly altering the SOP in so doing. Indeed, it is advantageous for the beamsplitting element to sample as little of the light as necessary. Preferably, the beamsplitting element transmits at least 80 percent of the one polarization state, more preferably at least 90 percent, and most preferably at least 95 percent. This can be accomplished in various ways.

For example, a planar glass window oriented at or near Brewster's angle may be used as a polarization-sensitive beamsplitter, since it samples essentially none of the P-component and approximately 8% per surface of the S-component. A window operated at other angles can also be used, and it is often especially convenient to situate the window at substantially 45° incidence to the beam being sampled. When the beam being sensed is coherent, or relatively so, a relatively thick window may be preferred in order to spatially displace the beams reflected at the entrance and exit faces of the window, and thus eliminate interference effects between them. It may be preferred to coat one face of the window with an antireflection coating, to reduce the intensity loss suffered by the main beam in passing through this element.

Alternatively, a polarization-sensitive beamsplitter cube can be made from two right-angle prisms of glass joined at their hypotenuses. A coating of a low-index material such as $MgF_2$ has been applied to the hypotenuse of one of the prisms, and then the prisms are joined with UV-15 epoxy from Master Bond (Hackensack, N.J.) to form a cube. This samples essentially no light of the P-component, and approximately 3.3% of the S-component. In yet another alternative, a layer of high-index material is substituted for the $MgF_2$ layer. It is beneficial to use an adhesive that provides a good match of optical index to either the prism material, or to the material used to make the coating. This eliminates ghost reflections that can cause interference fringes in the sample beam.

Based on the article "Giant Birefringent Optics in Multilayer Polymer Mirrors" M. F. Weber et. al. Science 287 pp. 2451–2456, March 31 (2000), it appears possible to construct near-normal incidence beamsampling means using giant birefringence optics to reflect a few percent of light in one polarization state while not reflecting a significant amount of the orthogonal polarization state.

There is another structure which is equivalent to a polarization-sensitive beamsplitter. If a planar window is placed in a beam at near-normal incidence, there is little polarization sensitivity in the beam sampling action, and the sample beam more or less accurately reflects the polarization state of the main beam. Such a device may be termed a polarization-neutral beamsampler. One may form a polarization-sensitive beamsplitter from a polarization-neutral polarizer together with a polarizing element such as a linear polarizer, or a circular polarizer constructed from a $\lambda/4$ waveplate followed by a linear polarizer. The polarizing element is placed in the sample beam, not the main beam. The type and orientation of the polarizing element define the sense of polarization selectivity for the sample beam.

Recognizing this, one can construct the present invention with polarization-neutral beamsplitters rather than polarization-sensitive beamsplitters, provided that the requisite polarizing elements are placed in the sample beams.

This approach has the benefit that it eliminates the need for retarders in the main beam. The decision whether to use polarization-neutral beamsplitters with polarizing elements in the sample beams, or to use polarization-sensitive beamsplitters, will be made for design reasons such as size, cost, and ease of construction for the alternative designs.

As will be apparent, the examples just given are illustrative rather than exhaustive in coverage, and there are a great many ways to realize the beamsampling element. Any component is suitable for practicing the present invention so long as it ultimately provides a polarization-dependent sample of the beam, which contains a proportion of the overall light that is large enough that the sample beam can be readily measured, yet is not so great as to produce undue insertion loss or polarization in the main beam.

A polarization compensator suitable for use in the present invention is shown in FIG. 1. The outer two retarders 11 and 15 have their slow axes 12 and 16 parallel or perpendicular to one another, and the middle retarder 13 has its axis 14 at 45° to them. The SOP of the beam leaving the retarder stack is linearly polarized along an axis that is parallel or perpendicular to the axis of the middle retarder. The retarder stack is essentially the same as that of Rumbaugh, and the operation is similar except that the present invention is operated in reverse: where Rumbaugh described converting light of known linear polarization to a continuously varying arbitrary SOP for homodyne detection purposes, the retarder stack in the present invention converts light of a continuously varying arbitrary SOP into a specific output SOP such as a linearly polarized state.

The first variable retarder 11 acts to convert the arbitrary input SOP to a linear polarization whose axis depends on the initial SOP. The second and third variable retarder 13 and 15 act as a Senarmont rotator to transform the axis of linear polarization to the desired orientation. Specifically, the middle retarder 13 further transforms the SOP to lie on the meridian of 0° longitude, which means that it is operated at a retardance of $\lambda/4$ or $3\lambda/4$. The third variable retarder 15 adjusts the Poincare latitude of the exit SOP as needed to place it on the equator without altering its longitude from zero.

Figure 2A:
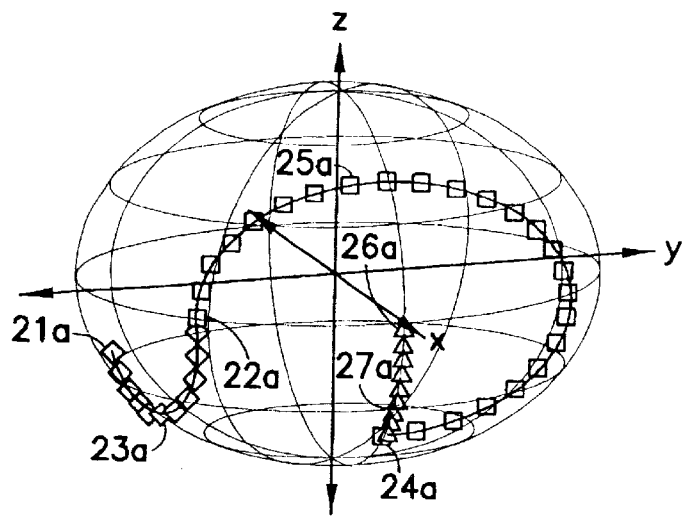
FIG. 2a shows a depiction of polarization state on the Poincare-sphere for light beams at various points in the polarization compensator 10. At optimum settings of retarders 11, 13, and 15, incident light in polarization state 21a is transformed by retarder 11 to a state 22a along path 23a, and then by retarder 13 to state 24a along path 25a, and finally to state 26a along path 27a. When retarder 11 has a slightly different retardance, as depicted in FIG. 2b, incident light in polarization state 21a is transformed to state 22b, 24b and 26b along paths 23b, 25b and 27b. When retarder 15 has a slightly different retardance, as depicted in FIG. 2c, incident light in polarization state 21a is transformed to states 22a, 24a, and 26c along paths 23a, 25a, and 27c.

One can see that errors in the exit SOP latitude may be corrected by adjusting the retardance of the third variable retarder, which does not alter the exit SOP longitude. This is shown in FIGS. 2a and 2c, by comparison of paths 27a and 27c, corresponding to slightly different settings of retarder 15. The result for the exiting beam is either SOP 26a or SOP 26b, depending on the retardance of element 15.

Conversely, the first retarder element 11 varies the longitude of the exit SOP, without altering its latitude. Adjusting the first element slightly about the desired retardance will shift the SOP of light exiting this element to lie slightly above or below the equator of the Poincare sphere. The middle retarder, being a $\lambda/4$ or $3\lambda/4$ plate at 0°, will transform this to an SOP that lies just East or West of the 0° longitude meridian. Finally, the third retarder further transforms this to a point on the equator, just east or west of the desired SOP.

Figure 2B:
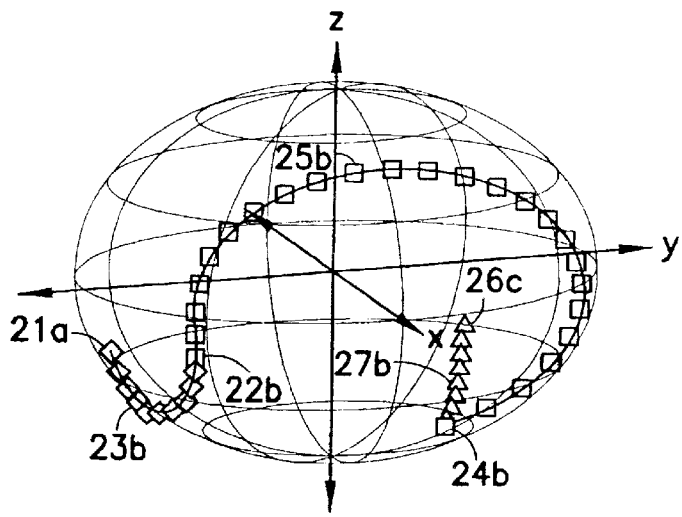
Figure 2C:
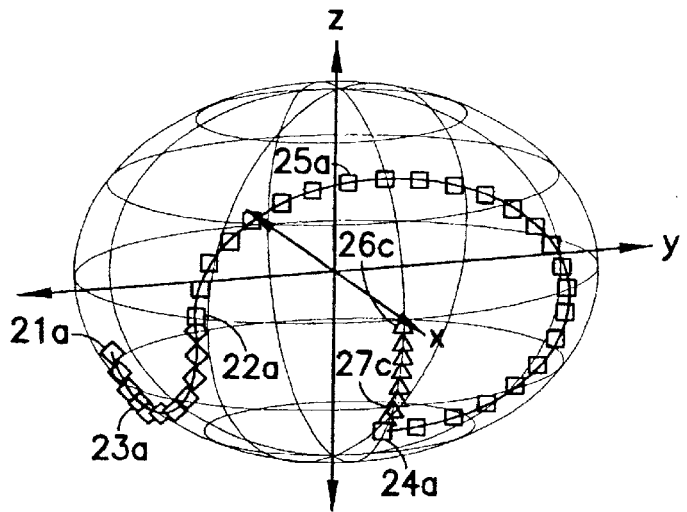

This is seen by reviewing FIGS. 2a and 2b, and comparing the paths 23a, 25a, and 27a for nominal settings of the retarder elements against paths 23b, 25b, and 27b when retarder element 11 has a slightly different value of retardance. The result is that light exiting the compensator has SOP 26b instead of SOP 26a, corresponding to a difference in longitude on the Poincare sphere.

The complicated actions on the Poincare sphere can be modeled using the Jones calculus and then mapped onto the sphere, which yields mathematically correct results, but little insight into how the device works. This is most easily visualized, and the action most readily understood, by straightforward geometric constructions performed on a sphere such as a globe. The action of a waveplate with retardance R and a fast axis oriented at θ, upon light at a given SOP, is as follows. If one places a protractor with its fixed leg on the equator of the sphere at a longitude of 2θ, opens the protractor so the swinging leg is at the incident SOP, then swings the protractor through an angle of 2(πR/λ), the swinging leg will then be at the exit SOP. If the incident SOP lies on the far side of the globe and so cannot be reached, the protractor may be placed at a location corresponding to 2(π/2+θ) instead, and swung through an angle of −2(πR/λ). The result is the same, namely that the swinging leg will indicate the exit SOP. This more graphical method is helpful in designing and debugging apparatus of the type used in this invention.

Turning to the invention for sensing SOP, the invention provides two signals that indicate latitude and longitude error on the Poincare sphere, or, equivalently, a pair of signals indicating orthogonal measures of error in SOP. The apparatus comprises an optional first retarder, a first beamsplitter, an optional second retarder, a second beamsplitter, an optional third retarder, an optional third beamsplitter and exit retarder stack. The output SOP is usually a fixed linear SOP, but it can be an arbitrary SOP if retarder stack is incorporated. The arbitrary output SOP can vary in time in a known way if the retarders comprising stack are variable.

While particular preferred embodiments are described herein, there are other arrangements which provide orthogonal measures of error in SOP using the principle of the invention: the beam SOP is sampled with a polarization-sensitive sampling element, then transformed in a known way by a fixed retarder element if needed, then sampled again by a second polarization-sensitive sampling element to measure a different aspect of the polarization state. The transformation and beam sampling element orientations are chosen so that the samples yield information about orthogonal excursions in SOP in the neighborhood of the desired SOP. Further, it may be arranged that the information is monotonic in the neighborhood of the SOP being sensed. This eliminates sign-based ambiguities in assigning a unique SOP.

It is further possible to pre- or post-transform the SOP of light passing through the system by a retarder element that precedes the first beamsplitter, or which follows the last beamsplitter. One reason for post-conditioning is to remove the transformation in SOP that was produced by the polarization state sensing apparatus itself. The overall polarization sensing apparatus usually contains one or more retarders which transform the SOP of the beam. The effect of the overall apparatus is equivalent to a single retarder and/or an optical rotator element.

For example, in the first preferred embodiment pictured below in FIG. 5, the transformation is that of a λ/4 wave plate oriented at 90°. It may be desirable to undo this transformation, or to superimpose a different transformation when the desired output SOP is different from the SOP which is used for sensing and control. That is, one may control the SOP at the entrance to the polarization sensing apparatus to keep it in a certain known state, then transform it so the output SOP is in a second, different known state.

If it is desired that the relationship between these two states be dynamic, one can incorporate a variable retarder in the output post-transformation network. This allows one to sense and lock the SOP at the entrance to the polarization sensor, yet to provide an output SOP that is selectable according to the transformation produced by the variable retarders in the output network.

As is well-known, any two retarders that are immediately adjacent in an optical path, and have parallel or perpendicular axes, can be replaced by a single retarder element. Thus, when a pre-conditioning retarder or post-conditioning retarder is desired, and the SOP sensor is immediately adjacent to another retarder element in the system, one can combine these functions and eliminate a component. The optical effect is unaltered by this, as is known to those skilled in the art of designing optical and polarization systems.

Figure 3:
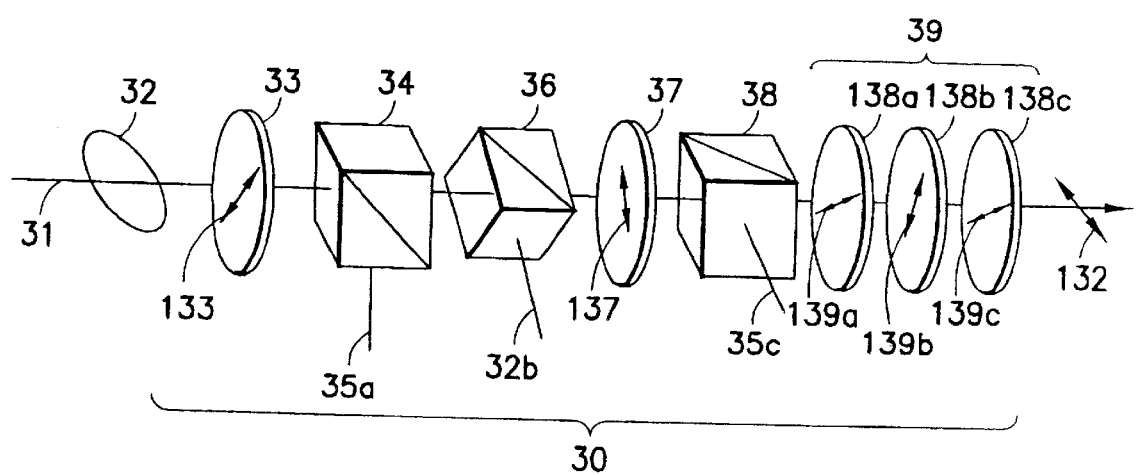
FIG. 3 shows a view of a beamsplitter arrangement 30, which samples beam 31 in polarization state 32, comprising retarder 33 with fast axis 133, beamsplitter 34, sample beam 35a, beamsplitter 36, sample beam 35b, retarder 37 with fast axis 137, beamsplitter 38, sample beam 35c, and optional retarder stack 39 comprising retarders 138a–c with axes 139a–c.

The first preferred embodiment of the SOP sensing apparatus is depicted in FIG. 3. The first retarder 33 is a λ/4 plate with its axis 133 at 45°, there is no second retarder, and the third retarder 37 is a λ/4 plate with its axis 137 at −45°. The desired SOP for incident light is horizontal polarization, with location [0,0] on the Poincare sphere. Here and throughout this description, sphere coordinates are given as [latitude, longitude]. All the beamsplitters 34, 36, and 38 are cubes constructed of two right-angle prisms of BK 7 glass cemented together along their hypotenuse with MasterBond adhesive UV-15. One of the prisms has a layer of $MgF_2$ along its hypotenuse, deposited by vacuum coating methods.

Figure 4A:
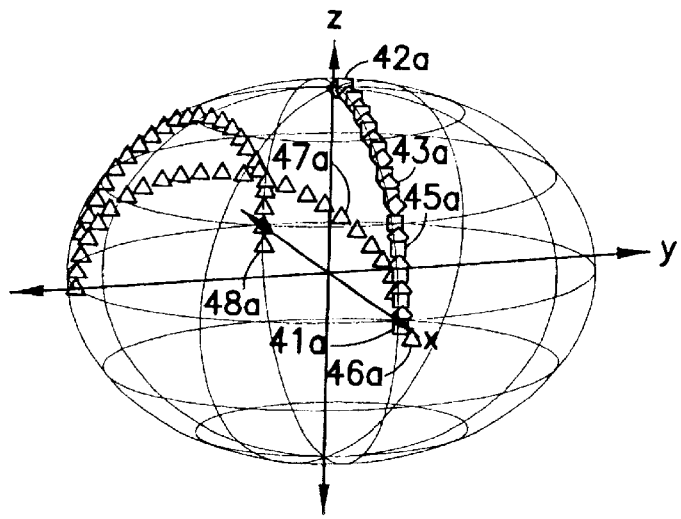
FIG. 4a shows a depiction of polarization state on the Poincare-sphere for light beam at various points in the beamsplitter apparatus 30. The SOP for light in the desired state is indicated by 41a as it enters the beamsplitter arrangement 30, by 42a after retarder 33, by 46a after retarder 37, and by 48a after optional retarder stack 39.
Figure 4B:
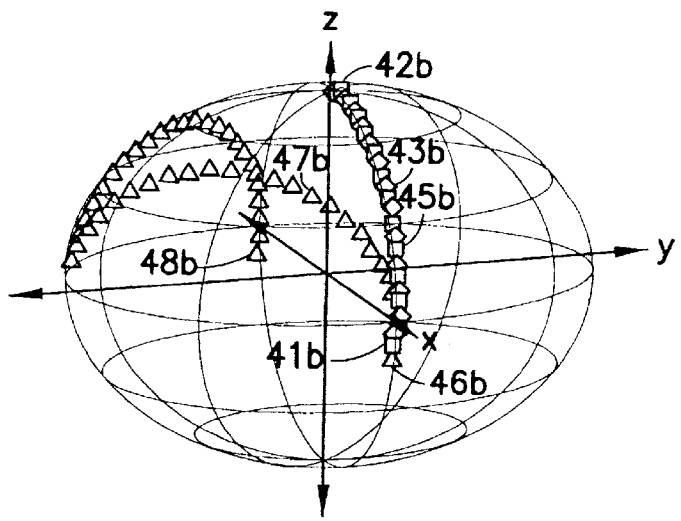
FIG. 4b depicts incident light in SOP 41b having only a latitude error relative to the desired state, having state 42b after retarder 33, state 46b after retarder 37, and state 48b after retarder stack 39.
Figure 4C:
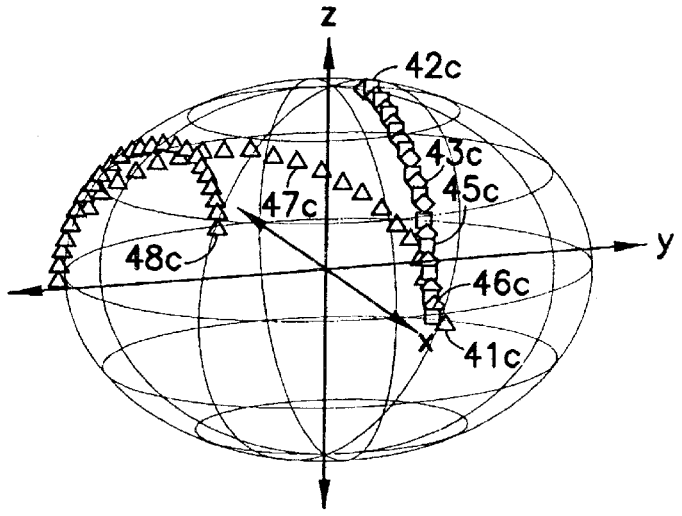
FIG. 4c depicts incident light in SOP 41c having only a longitude error relative to the desired state, having state 42c after retarder 33, state 46c after retarder 37, and state 48c after retarder stack 39.

The first retarder 33 produces a 90° rotation of the Poincare sphere about the point [0,90], so that points near the desired point [0,0] are shifted to points near the pole, and the percentage of light that is horizontally polarized is 50%. Indeed, incident light of any linear polarization lies on the equator of the sphere and so will be rotated by retarder 33 to lie on the 90 degree longitude meridian. All such light is thus 50% horizontally polarized when it encounters the first beamsplitter. However, for incident light having a slightly higher (or lower) latitude than zero, the proportion that is horizontally polarized after retarder 33 is reduced (increased), and the change in SOP latitude is directly detectable by observing the flux in the first sample beam. Thus, the first sample beam flux directly varies with latitude of the input SOP, in a monotonic fashion. This is depicted in FIG. 4a by point 42a for incident light in the desired SOP, and in FIG. 4b by 42b and in FIG. 4c by 42c for incident light having latitude and longitude errors, respectively. It can be seen that the x location then directly indicates the latitude error for incident light.

The first beamsplitter cube 34 is arranged so it preferentially sample horizontally-polarized light, and samples little or none of the vertically-polarized light. Thus, the flux in the sample beam 35a is $$F_{sample} = I_{main} P_{hor} k_h + P_{ver} k_v \quad [1]$$

where $I_{main}$ is the total flux in the main beam, $P_{hor}$ and $P_{ver}$ are the fractions that are horizontally and vertically polarized, respectively, and $k_h$ and $k_v$ are the beamsplitter sample fractions for horizontal and vertical polarization states. If one presumes that the beamsplitter 34 samples none of the vertically polarized light, which is a fairly good approximation, then $k_v = 0$ and one may write $$F_{sample} = I_{main} P_{hor} k_h \quad [2]$$

Reviewing equation 2, the flux in the sample beam varies directly with the degree of horizontal polarization in the main beam. The degree of horizontal polarization, in turn, is given by the relative position along the x axis that connects the points [0,0] and [0,180] on the Poincare sphere. At position [0,0] light has 100% horizontally polarization, decreasing linearly with x to 0% horizontally polarization at position [0,180]. Thus, by reading the flux in the sample beam 35a from the first polarization-sensitive beamsplitter 34, one obtains a linear measure of x and thus of latitude error in the incident SOP. This relationship, while it is strictly trigonometric, is approximately linear over at least the range of /8 about the equator. Of course, the reading also depends on the overall intensity of the beam.

At the point in the optical system after beamsplitter 34, the y location indicates longitude error for incident light. This can be seen by comparison of points 42c and 42a in FIGS. 4c and 4a. This relationship, while it is strictly trigonometric, is approximately linear over at least the range of /8 about the nominal longitude. The y location can be measured by reading the flux from the second beamsplitter 36, which is oriented to preferentially sample light polarized at 45°. This is achieved by orienting the cube beamsplitter 36 oriented at 45°. The sample beam 35b thus obtained will propagate at −45° and the photodetector must be suitably placed to receive the beam.

The SOP is transformed by the third retarder 37 so the exit SOP once again lies at [0,0], i.e. is horizontally polarized.

The third beamsplitter 38 samples the beam at this point to produce beam 35c. This beamsplitter is identical to the other beamsplitters in construction, and is oriented to preferentially sample vertically polarized light. Thus there is no flux in beam 35c when the exit SOP is in the desired state.

In a second preferred embodiment, the first retarder 33 is omitted, and the nominal incident SOP is right circularly polarization. The nominal exit SOP is horizontal polarization, due to the action of retarder 37. Or, this element may also be omitted, in which case the exit SOP is also circular polarization. This embodiment provides orthogonal linear measures of SOP error. However, since it is designed to operate for SOPs near the pole of the Poincare sphere, the measures are not latitude and longitude but rather the x and y coordinates of points on the surface of the sphere.

Figure 5:
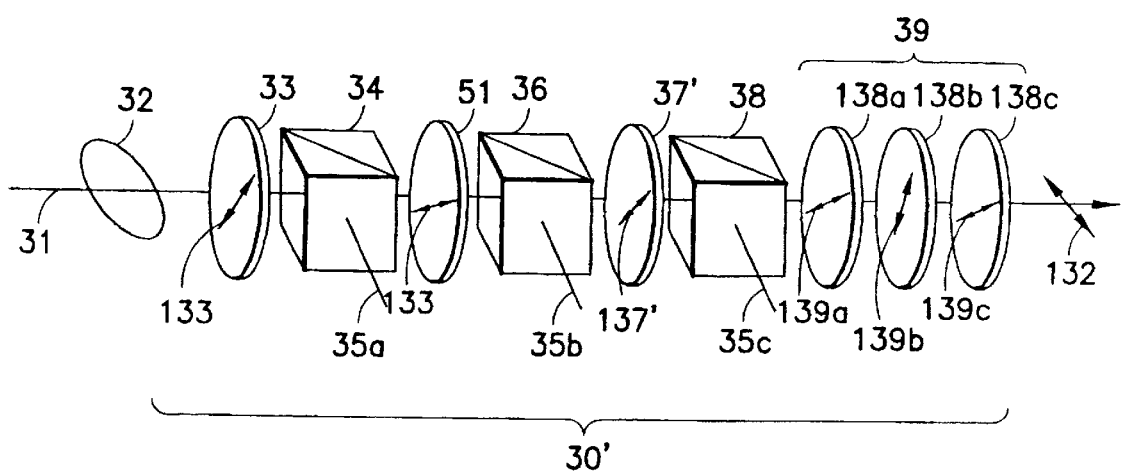
FIG. 5 shows a view of an alternative beamsplitter arrangement 30', which samples beam 31 in polarization state 32, comprising retarder 33, beamsplitter 34, sample beam 35a, retarder 51, beamsplitter 36, sample beam 35b, retarder 37', beamsplitter 38, sample beam 35c, and optional retarder stack 39.

In a third preferred embodiment, depicted in FIG. 5, beamsplitters 34, 36, and 38 share a common orientation and preferentially sample vertically-polarized light. Retarders 51 and 37' are employed after the first and second beamsplitters, respectively. Once again the sample beams 35a and 35b provide orthogonal measures of the SOP of light incident upon the assembly.

This works as follows: light at or near the SOP [0,0] is transformed by retarder 33, which is a λ/4 plate oriented with its axis at 45°. As represented on the Poincare sphere, this element rotates the SOP through 90° about the point [0,90] and brings it to a point near the north pole. Beamsplitter 34 produces sample beam 35a whose intensity varies directly with the degree of vertical polarization in the beam, and so indicates the −x coordinate of the SOP at this point. The flux in this beam varies directly and monotonically with latitude error in the SOP of incident light. The sense of this variation is reversed relative to the first embodiment, however, since here the beamsplitter 34 is oriented to preferentially sample vertically polarized light, rather than horizontally polarized light as in the previous embodiment. Retarder 51 is a λ/2 plate whose axis is at 22.5°. This transforms the SOP to a point near the opposite pole as represented on the Poincare sphere. It also transforms displacements in y into displacements in x, and vice versa. Recall that longitude errors in the SOP of incident light result in displacements in y immediately after retarder 33; these are evident as displacements in x immediately after retarder 51. These are observed by measuring the flux in sample beam 35b produced by the second beamsplitter 36. Since this element preferentially samples vertically polarized light, the sample fraction varies directly with x, which in turn corresponds directly and monotonically with longitude errors in the incident beam. Of course, the flux also scales directly with the intensity of the incident beam.

Figure 6A:
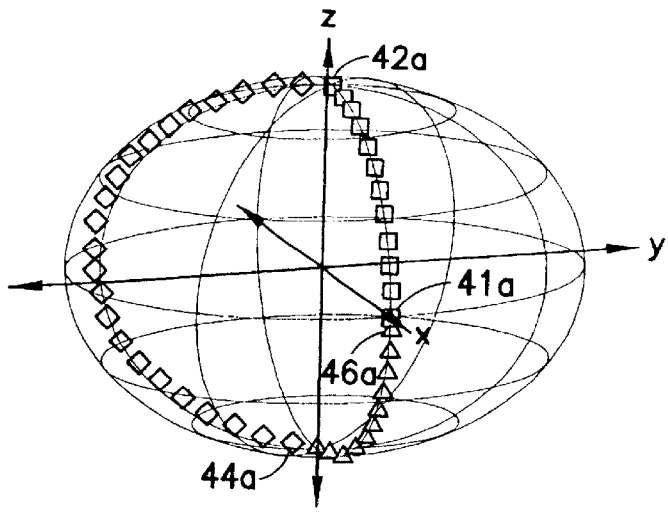
FIG. 6a shows a depiction of polarization state on the Poincare-sphere for light beam at various points in the beamsplitter apparatus 30'. Incident light in the desired SOP 41a is transformed to SOP 42a by retarder 33, then to SOP 44a by retarder 51, then to SOP 46a by retarder 37', which would be further transformed by optional retarder stack 39'.
Figure 6B:
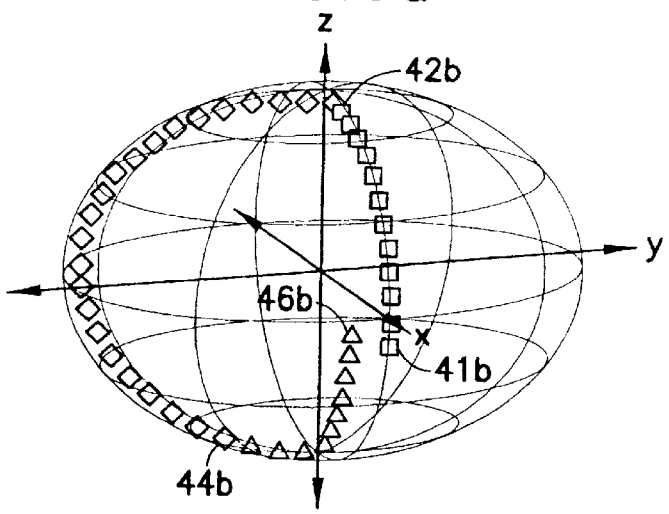
FIG. 6b depicts incident light in SOP 41b having only a latitude error relative to the desired state, which is transformed to SOPs 42b, 44b, and 46b by the same optical elements.
Figure 6C:
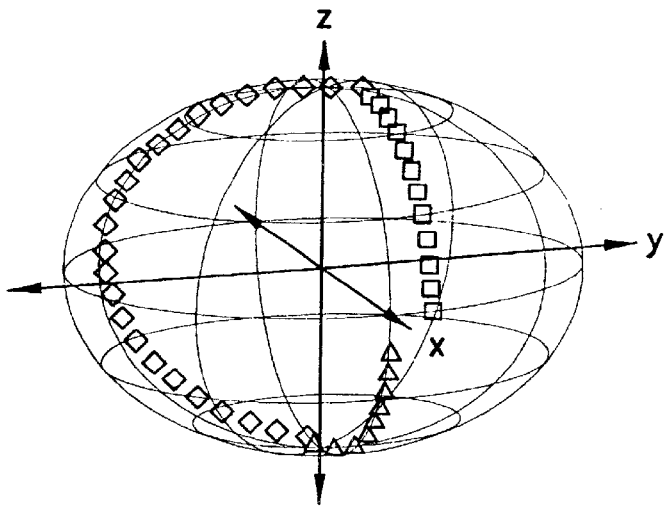
FIG. 6c depicts incident light in SOP 41c having only a longitude error relative to the desired state, which is transformed to SOPs 42c, 44c, and 46c by the same optical elements.
Figure 7:
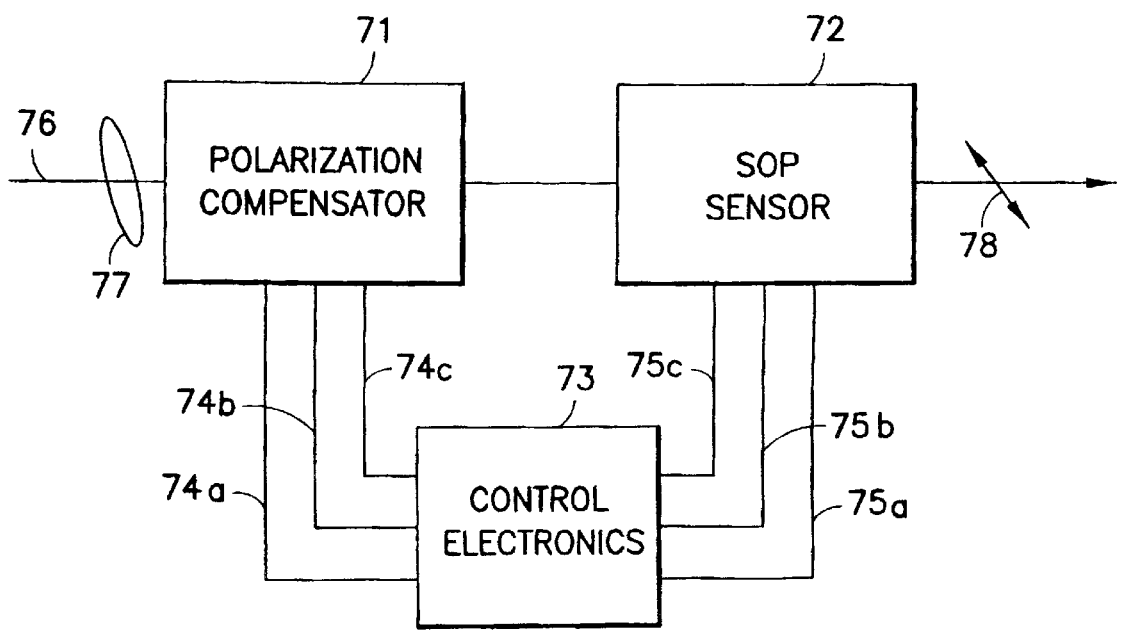
FIG. 7 depicts a polarization controller consisting of a polarization compensator 71 in optical series with a polarization-sensitive beamsplitter arrangement 72, controlled by electronics 73. The electronics receive signals 74a, 74b and optional signal 74c, from the beamsplitter arrangement and produce control signals 75a, 75b, and 75c which generate drive signals 76a, 76b, and 76c using amplifier means 77. The control calculations and servo action is performed by servo controller 78.

Retarder 37' is a λ/4 wave plate oriented with its axis at 45°, so it transforms the SOP from the polar region to the location [0,0] on the Poincare sphere, where it is sampled by beamsplitter 38 to yield sample beam 35c. There is little or no flux in sample beam 35c, since beamsplitter 38 preferentially samples vertically polarized light, and the light is horizontally polarized at this point in the apparatus. Finally, optional retarder stack 39 transforms the SOP from horizontally polarized to some other SOP if this is desired. In the embodiment for which Poincare sphere diagrams are presented as FIG. 6, stack 39 is omitted.

This embodiment has the advantage that all the beamsplitters are oriented identically, to preferentially sample vertically polarized light. The construction is often simplified as a result, since the three sample beams all propagate in the same direction and can be detected using e.g. three adjacent photodiodes on a printed circuit board, or a three-element photodiode array. This enables making a more compact assembly and simplifies alignment of the beams and detectors.

In a variation on this embodiment, the beamsplitters 34 and 36 are oriented to preferentially sample horizontally polarized light, and the sense of variation in flux in beams 35a and 35b with errors in input SOP latitude and longitude is reversed.

In another variation on this embodiment, beamsplitters 34, 36, and 38 are oriented to preferentially sample horizontally polarized light. Sample beam 35c does not contain nominally zero flux, but instead for light near the desired SOP provides a few percent sample of the main beam intensity. The fraction of the beam that is sampled into beam 35c does not vary rapidly as a function of input SOP for small excursions in SOP—indeed the local slopes dx/dθ and dx/dφ for excursions in latitude or longitude are identically zero. Sample beam 35c can be used to monitor the incident beam intensity, albeit only when the beam is known to be at or near the desired SOP.

In a third variation on this embodiment, beamsplitter 38 is oriented to preferentially sample horizontally polarized light but retarder 37' is a λ/2 wave plate with its axis at 45°. If one describes the position on the surface of the sphere as [x, y, z] prior to element 37', the position afterward is [−x, y, −z]. So, if the portion of the beam that is horizontally polarized before element 37' is α, the portion that is horizontally polarized afterwards is (1-α). Samples 35b and 35c offer complementary measures of the degree of horizontal polarization: for light that is purely horizontal at beamsplitter 36, sample 35b is a maximum and sample 35c has no flux, and vice versa. Accordingly, it is said to be a 'complementary' beamsplitter arrangement. For the case of light that has equal components of horizontal and vertical polarization at beamsplitter 36, samples 35b and 35c will contain equal flux (provided that the beamsplitters are not themselves significantly polarizing, viz. $k_h \ll 1$).

This embodiment provides a benefit in systems where the intensity of the beam being measured is unknown and prone to variation, since by summing the flux in beams 35b and 35c, one obtains a direct measure of the main beam intensity. Also, it can be beneficial that the flux is identical in beams 35a, 35b, and 35c when the incident light has the desired incident SOP.

In the case of the third variation just described, one may choose to include an exit retarder stack 39 consisting of a λ/4 plate with its axis at −45°, so that the output SOP is horizontally polarized. Or, if it is a λ/4 plate with its axis at +45°, the output SOP is vertically polarized.

In another preferred embodiment, the beamsplitters are oriented to preferentially sample light that is polarized at +45°, and to sample a relatively small portion of light that is polarized at −45°. This can be achieved by orienting the beamsplitters with their faces at 45° to the horizontal. This means that the beamsplitters 34, 36, and 38 provide a sample beams whose flux varies directly according to the location along the y axis in a Poincare sphere representation. In this embodiment, there is no entrance retarder 33; incident light immediately encounters the first beamsplitter 34. Light in the desired horizontal SOP has a 50% component in this orientation, and positive (negative) errors in longitude from this point will increase (decrease) the sample fraction linearly. Thus the first sample beam 35a indicates longitude error about a desired operating point. Latitude errors have no effect on this sample flux. The second retarder 51' is a λ/4 retarder with its axis at 0°, which rotates the SOP by 90° about the point [0,0], and thus transforms latitude errors into longitude errors. The second beamsplitter creates a sample beam 35b whose flux varies linearly with latitude, in a monotonic fashion about the desired SOP. This sample flux is unaffected by longitude errors in the incident SOP. The third retarder 37 consists of a λ/2 wave plate whose axis is at 0°, so that the third beamsplitter 38 provides a sample beam 35c whose flux is complementary to that in sample beam 35b, as described above. Alternatively, the third retarder can comprise an assembly of two retarders that transform the SOP to be linearly polarized at −45°, in which case the flux in the third sample beam 35c is nominally zero. A suitable retarder assembly can be made from a λ/4 wave plate oriented with its axis at 45° followed by a λ/4 wave plate oriented with its axis at 90 °.

The immediately preceding preferred embodiment can also be constructed where the entire coordinate system is rotated by +45° as follows: beamsplitters preferentially sense vertically polarized light, no entrance retarder, second retarder 51' is λ/4 plate with axis at 45°, third retarder 37 is λ/2 plate with axis at 45°. Such an assembly can be used to sense incident light with an SOP that is linearly polarized at 45°, or near this SOP.

The various aspects of these embodiments may be combined, according to the known art of polarization manipulation. Similarly, there are a plethora of designs which can be used to realize an SOP monitor in accordance with the present invention. The essential element is to obtain two orthogonal, monotonic measures of the input SOP by means of polarization sensitive beamsplitters and retarders. The role of the retarders is to transform the light along the Poincare sphere so that orthogonal measures of the incident SOP are obtained.

As noted above, these designs provide equal intensity in the sample beams 35a and 35b, which may be used to create polarization control systems using feedback. The orthogonality of these measures enables one to correct the proper variable (i.e. latitude or longitude), when tracking or modifying the SOP via the polarization compensator or in a PMD correction system. The monotonicity enables one to have a known sense of feedback, rather than to rely upon hunt-and-climb algorithms or dithering.

However, there is more than one point on the Poincare sphere which meets the condition of having equal flux in beams 35a and 35b. Rather, an infinite number of points meet this condition, and the locus of such points forms a great circle passing through the points [0, 0], [0, 180] and [45,−90]. For the embodiment of FIG. 5, all SOPs that lie on this circle meet the condition that equal signals would be produced by identical photodetectors placed in beams 35a and 35b. Thus, this condition alone is insufficient to ensure that the incident SOP is being maintained at the desired location. While this is illustrated with regard to FIG. 5, the problem is present generally for all embodiments except where the signals indicating latitude and longitude attain a local maximum or minimum at the desired SOP.

There are several ways to locate the SOP uniquely at the desired point. One approach is to use an additional, third beamsplitter and photodiode to provide a third sample 35c of the main beam that is designed to enable determination of the flux levels in beams 35a and 35b corresponding to the desired SOP. For example, the third sample beam 35c may have an intensity that is nominally zero, or in any case a minimum, when the incident beam is in a desired SOP. This has been illustrated in some of the above embodiments. Retarders may be used, if appropriate, to alter the SOP of light at the point in the optical path where this beamsplitter is located, to enable obtaining such a sample, using the methods illustrated above. The third sample beam 35c is monitored by a photosensor that produces an electrical output indicating sample flux, which is observed along with the signals indicating flux in beams 35a and 35b.

Various servo schemes can be implemented using these signals. For example, one can utilize signals 35a and 35b to construct a servo system that drives a polarization controller having essentially orthogonal control inputs corresponding to latitude and longitude on the Poincare sphere, or the equivalent. Nominally equal signal levels are sought in beams 35a and 35b, so while these are essentially independent servo systems, the same set point $F_d$ is sought in both servo controllers. Since in practice there are finite servo errors, the instantaneous SOP varies and, over time, expresses a variety of states around the nominal target SOP. It is normally possible to take actual readings of flux in 35a, 35b, and 35c more rapidly than the servo response time, so the fluxes corresponding to these states can be readily monitored. When the flux in the third beam 35c is observed to attain a lower value than previously seen, the system is imputed to be closer to the desired SOP, and the servo set point $F_d$ is updated to reflect the instantaneous values of flux in beams 35a and 35b. In this way, the system walks toward the desired SOP based on the flux in the third beam 35c. Note that finite servo error is vital in exploring locally adjacent SOPs, which are either rejected as farther from the desired SOP (by normal servo action) or accepted as closer to the desired SOP (by updating the servo set points to the observed flux levels in beams 35a and 35b).

The servo mechanism just described works well to identify the optimum SOP, but without further refinement it does not always adapt to changes in flux in the incident beam. For example, if the input beam becomes brighter, the flux level $F_d$ used as set points in beams 35a and 35b should increase. Yet since sample beam 35c is also brighter, and the servo system described thus far revises the set point only upon a reduction in this signal, it does not recognize that it is appropriate to revise the associated set points.

This is readily addressed by incorporating a periodic review of the set points, such as updating the set points $F_d$ at predetermined time intervals whether or not the flux in beam 35c has attained a new minimum. The updated set points are those corresponding to the SOP at which the third sensor expressed its lowest value during the last time interval. In this way, a rolling update is undertaken that reflects the best estimate of set points during an interval, or when an overall improvement is available.

This arrangement works well when the intensity of the incident beam changes much more slowly than the SOP. This is frequently the case in optical communications systems, and the above arrangement may then be used. But in the alternative case, when intensity changes as rapidly as the SOP, or comparably so, a different approach is favored. Then it is preferable to use an embodiment that provides complementary outputs at 35b and 35c. This was the case for certain embodiments above, such as where e.g. 35b preferentially senses horizontally polarized light and 35c senses vertically polarized light, or one senses light polarized at +45° while the other senses light polarized at −45°. Their signals are complementary in the sense that when one increases due to change in SOP, the other decreases correspondingly. Thus, their combined flux is proportional to incident flux but independent of SOP.

By summing the signal from photodiodes placed in these beams, one obtains an SOP-invariant measure of total incident intensity. The summing can be done by analog circuitry or by a digital processor that adds digitized readings representing the flux in each of these two beams.

Next, one scales the signals from 35a and 35b by the total flux (35b+35c), to yield normalized signals $S_{norm\ A}$ and $S_{norm\ B}$:

$$S_{norm\ A} = S_{35a}/[S_{35b}+S_{35c}] \qquad [3]$$

$$S_{nor\ B} = S_{35b}/[S_{35b}+S_{35c}] \qquad [4]$$

This normalization can be implemented by means of analog divider circuitry, or by a digital calculation. The measures $S_{normaA}$ and $S_{normaB}$ are invariant of input intensity levels, and can be used for SOP sensing, or active SOP control. The desired servo set point corresponds to values of 0.50 in $S_{norm\ A}$ and $S_{norm\ B}$ if the photodiodes and beamsplitters are identical. This approach compensates for even essentially instantaneous variations in the incident beam intensity.

There is another feature of this approach which is especially apt for servo control purposes. In optoelectronic servo systems where light is modulated to achieve a target level, the overall servo gain normally scales as the intensity of the beam being controlled. As a result, the servo dynamics are affected when the beam becomes brighter and dimmer, and the system can ring or become unstable. Use of the normalized signals in [3] and [4] eliminates this problem.

Yet another approach can be used to identify the actual operating SOP from among the points along the locus which produces equal flux in beams 35a and 35b. This approach is suitable when the intensity of the incident light changes only very slowly compared to changes in incident SOP. It has the benefit, however, that the third beamsplitter and third photodetector may be omitted, with a savings in space and cost.

The nominal SOP is unique in that excursions in latitude on the Poincare sphere affect the flux in only one of the sample beams, for example 35a, without altering the flux in the other beam, i.e. 35b. The roles of the two detectors can be interchanged by suitable design of the SOP detector, if desired, without altering the principle now described. Similarly, excursions in longitude only affect the flux in beam 35b. The polarization controller also has two orthogonal controls, which produce excursions along latitude and longitude lines on the sphere. Hence we may consider the flux in beams 35a and 35b as indicating position on a coordinate system which is aligned with that of the controls for the polarization compensator, when viewed on the Poincare sphere.

However, the correspondence between controls and SOP flux levels is only true at the nominal SOP. At other SOPs, adjustments of the longitude control on the polarization controller will typically produce a change in flux levels in both beams, 35a and 35b. The sign and magnitude of the correlation between excursions in the longitude adjustment of the polarization controller, and response in the nominally orthogonal beam 35b, indicates the extent to which the actual SOP departs from nominal. In practice, measurement of the cross-correlation between compensator and SOP sensor is confounded by the change in incident SOP, which alters the SOP at the sensor without regard to the control signal sent to the polarization controller. It may be thought of as noise, and indeed the actual SOP differs from that one would impute from the control signal alone. However, over the long term, excursions from the mean are random. So, the cross-correlation can be monitored on an ongoing basis, and used to adjust the SOP by altering the set points used for flux levels in 35a and 35b. This drives the servo to the desired set point, at which operating point the cross-correlations are zero.

Such an approach has the least cost and size, but is least able to cope with changes in the incident flux, since it requires some time during operation to observe the statistical correlation between controller signal and SOP flux level. It is preferred only when the signal is sure to be well-behaved in intensity.

In embodiments where continuous tracking and servo control of polarization state is required, there is the additional consideration of 'resets'. The retarder elements in the polarization compensator have finite adjustment ranges, typically less than one wavelength of light. There are two types of resets, which are performed when the first or third retarder, respectively, reach their limit of travel.

The reset of the third retarder is straightforward. The third and second retarder of the polarization compensator form a Senarmont rotator, with the second retarder expressing $\lambda/4$ or $3\lambda/4$ and the third retarder expressing a range from [0, $\lambda/2$]. When the third retarder reaches either end of travel, the second retarder switches from $\lambda/4$ to $3\lambda/4$, or vice versa, depending on where it was at the time the reset was triggered. Then continued Senarmont rotation corresponds to setting the third retarder to values closer to the middle of its range, rather than beyond its limit of travel. This reset is performed exactly as described in Rumbaugh and as known in the prior art. However, recall that the present invention converts incident light in an arbitrary SOP to a known linear SOP, whereas Rumbaugh converted a known linear SOP to an arbitrary SOP. So in comparing that teaching and this, one must be alert that the retarder nomenclature is similarly reversed.

The reset of the first retarder is done in a way that is a great improvement over the prior art. While the reset action is the same, the information provided in the present invention by the polarization sensor enables continuous servo control even during the reset. This makes it much easier to achieve the precise polarization transformations involved, which are quite complicated in Rumbaugh. Further, the system can respond to changes in the incident SOP even while the reset is underway, without the 'dead' time that was characteristic of the prior art.

In the prior art, when the first retarder hits its limit of travel, the second and third retarder are moved in synchrony so the endpoint of the transformation they produce, is walked in a semicircle on the Poincare sphere. This semicircle has its center at the point [0, 90] or equivalently [0, 270]. At the same time, the first retarder is adjusted so it produces a transformation whose endpoint sweeps out an identical, but opposing semicircle. The rate at which the first retarder sweeps its semicircle is precisely matched to the rate at which the second and third retarder sweep out their semicircle. The combined actions cancel, or have this as their goal, so there is no change in the polarization action of the controller as a whole. At the conclusion of the reset the first retarder is at the opposite end of its travel.

Achieving this in practice is tricky, as it requires knowing the response curves of three nonlinear, time-dependent electro-optic elements, and doing trigonometric calculations in real time to balance their actions. To synchronize the actions of the retarders, one typically breaks the semicircle into a number of smaller segments, and then sets each of the retarders to its proper setting, repeating this for each of the segment endpoints in turn. Thus, the overall reset involves a number of steps that produce an overall effect, and each of those steps takes a finite time, which is comparable to the response time of the electro-optic element involved. Until the entire sequence is completed, the servo cannot respond to new information or execute feedback control.

Figure 8:
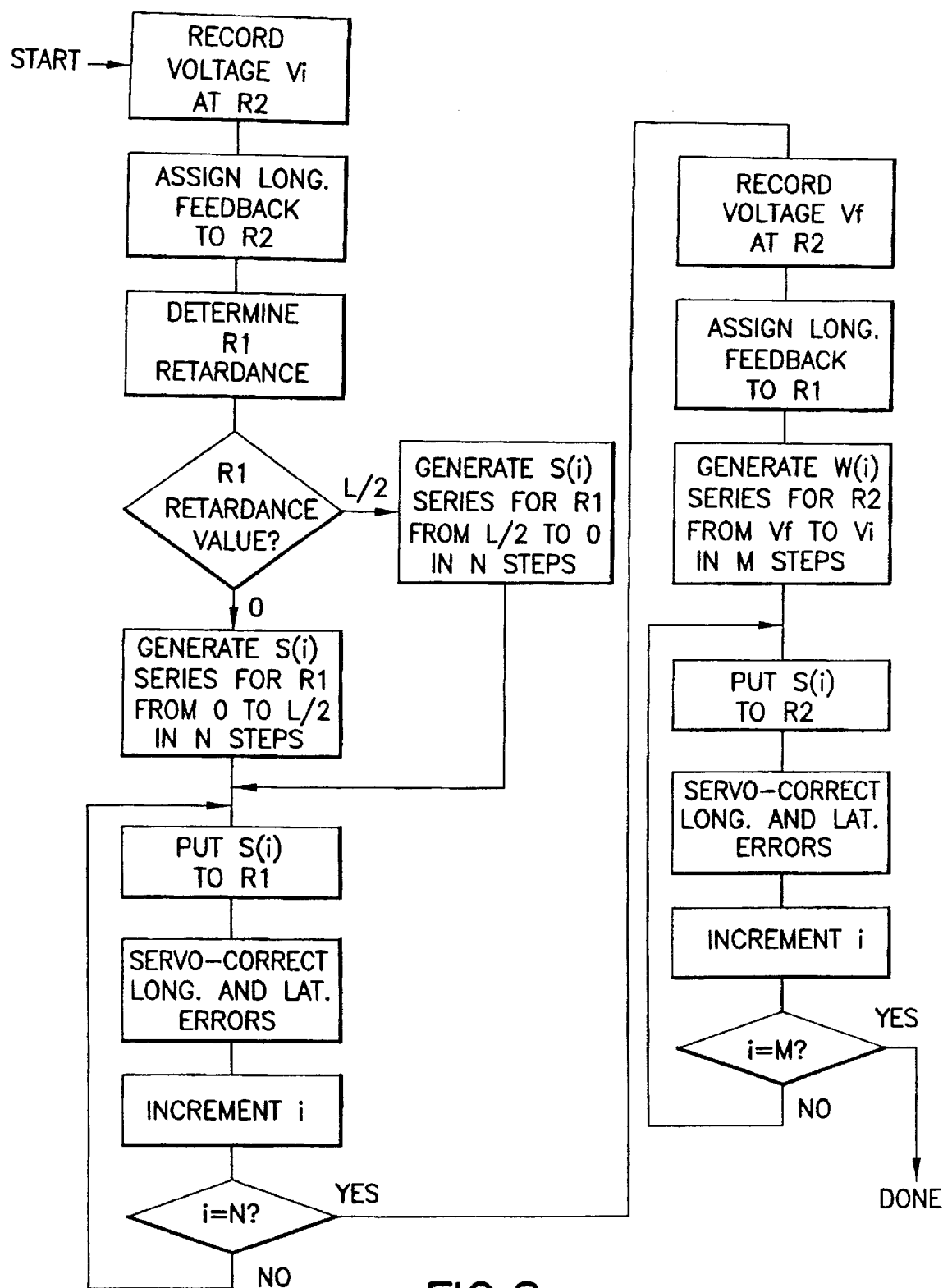
FIG. 8 depicts a flow chart diagram illustrating how the inventive SOP sensing apparatus can be used with a polarization controller to handle the 'reset' of the first retarder element.

In contrast, the present invention enables the following approach, which is diagrammed in FIG. 8. The first retarder is walked from the end of travel which provoked the reset, to the opposite end of travel. As in the prior art, this is done in several steps, typically 10 to 30. During the reset, the first retarder does not respond to the longitude servo control signal as it usually does, but only to the programmed steps that work it to the other end of its travel. Instead, the latitude control signal is sent to the third retarder and the longitude signal is sent to the second retarder. This assignment of signals will indeed provide for transforming light that reaches the second retarder in any SOP whatever, into linearly polarized light at 0° orientation at the output. The rervo action during the reset responds both to changes in the SOP of the incident beam, and to the changes provoked by walking the first retarder through its range. Perturbations springing from either source are removed by the second and third retarder.

Consequently, the second and third retarders are forced to take the proper values by servo action, and thereis no need for the complex choreography between the various retarders as was required in Rumbaugh. Further, the servo remains active to remove changes in incident SOP during the reset. Bacause of this, the second retarder may not be exactly at its nominal value of $\lambda/4$ (or $3\lambda/4$) at the conclusion of the reset. So, at the end of the reset, the following steps are taken. First, the servo signals are re-established in their normal way, namely, longitude errors assigned to the first retarder and latitude errors assigned to the third retarder. Second, the retardance or drive level of the second retarder is noted and compared with its nominal retardance or drive level. The second retarder is then walked from whatever value it holds, to its nominal value, in several small steps. During this time, the first and third retarders are under active servo vontrol, and remove the SOP effects of this change, so the output SOP is unaltered by it.

To summarize, then, the sequence involved in resetting the first retarder is this: the servo signals are re-assigned while the first retarder is walked back to its opposite end of travel. Then, the servo signals are restored to their normal assignments, while the second retarder is slewed from whatever value it holds, to its nominal value. This enhanced method of control is enabled by the orthogonal controls provided by the present invention, without which it would be difficult or impossible to achieve servo control during the stepped walk of the first retarder, and later, of the second retarder.

In general, one needs to know the electro-optic response of the retarders, in order to recognize when the limit of travel is reached, to accurately place the second retarder in the $\lambda/4$ or $3\lambda/4$ state, and so on. It can be helpful to have a representative region of the polarization compensator available to be sensed, and to pass a reference beam of known wavelength and stable intensity through this region. By observing the electro-optic response in this region, one can impute the response in the region that is actually controlling the beam of interest. The representative region can have means to apply a different voltage than is used in the beam of interest, by e.g. pixelating the device. This way, the electro-optic curves for the retarders can be measured, either continuously or at intervals, and the limits updated on the fly to eliminate the effects of thermal drift, aging, and so on.

So while there have been shown various embodiments and arrangements shown, these can be used in combination, or together with other known art, as will be apparent to those skilled in the art. Such combinations, as well as modifications, equivalent arrangements, substitutions, and the like, are within the scope of the invention, which is limited in scope only by the attached claims.

I claim:

1. A method of sensing the state of polarization of a light beam comprising
    separating from the light beam a first sample beam and transmitting the first remaining light beam,
    transforming the state of polarization of the first remaining light beam,
    separating from the transformed light beam a second sample beam and transmitting the second remaining light beam, and
    measuring the intensity of the first sample beam, and
    measuring the intensity of the second sample beam,
    deriving from the intensity of the first sample beam information concerning one of the Poincare latitude and longitude, and deriving from the intensity of the second sample beam information concerning the other one of the Poincare latitude and longitude.

2. The method of claim 1 wherein said information concerning one of the Poincare latitude and longitude is an estimate of said one of the Poincare latitude and longitude, and wherein said information concerning the other one of the Poincare latitude and longitude is an estimate of said other one of the Poincare latitude and longitude.

3. The method of claim 1 wherein the step of separating from the light beam a first sample beam is performed by the use of a beamsplitter.

4. The method of claim 3 wherein the beamsplitter is oriented to preferentially separate from the light beam a first sample beam having light of a first linear state of polarization.

5. The method of claim 4 wherein the beamsplitter transmits substantially all of the light polarized orthogonal to the first linear state of polarization.

6. The method of claim 5 wherein the beamsplitter transmits more than 80% of the light having the first linear state of polarization.

7. The method of claim 5 wherein the beamsplitter transmits more than 90% of the light having the first linear state of polarization.

8. The method of claim 5 wherein the beamsplitter transmits more than 95% of the light having the first linear state of polarization.

9. The method of claim 1 wherein the step of separating from the transformed light beam a second sample beam is performed by the use of a beamsplitter.

10. The method of claim 9 wherein the beamsplitter is oriented to preferentially separate from the light beam a second sample beam having light of a second linear state of polarization.

11. The method of claim 10 wherein the beamsplitter transmits more than 80% of the light having the second linear state of polarization.

12. The method of claim 10 wherein the beamsplitter transmits more than 90% of the light having the second linear state of polarization.

13. The method of claim 10 wherein the beamsplitter transmits more than 95% of the light having the second linear state of polarization.

14. The method of claim 1 further comprising the step of transforming the sensed light beam to a desired state of polarization comprising adjusting one of the Poincare latitude and longitude of the light beam to a predetermined degree based on the measured intensity of the first sample beam, adjusting the other one of the Poincare latitude and longitude of the light beam to a predetermined degree based on the measured intensity of the second sample beam.

15. The method of claim 14 wherein the steps are repeated until the light beam is at a desired Poincare latitude and longitude.

16. The method of claim 14 wherein the intensity of the first sample beam varies linearly with the Poincare latitude of the light beam.

17. The method of claim 16 wherein the linear variation between the intensity of the first sample beam and the Poincare latitude of the light beam holds over at least the range of $\pi/8$ radians in the vicinity of a desired Poincare latitude.

18. The method of claim 14 wherein the intensity of the second sample beam varies linearly with the Poincare longitude of the light beam.

19. The method of claim 18 wherein the linear variation between the intensity of the second sample beam and the Poincare longitude of the light beam holds over at least a range of $\pi/8$ radians in the vicinity of the desired Poincare longitude.

20. The method of claim 1 which further comprises transforming the light beam before the step of separating from the light beam a first sample beam.

21. The method of claim 1 which further comprises transforming the light beam after the step of separating from the light beam a second sample beam.

22. The method of claim 21 which further comprises separating a third sample beam from the light beam that is transformed after the step of separating from the light beam a second sample beam.

23. The method of claim 22 wherein the step of separating a third sample beam is performed by the use of a third beamsplitter.

24. The method of claim 23 wherein all the beamsplitters are oriented to preferentially sample horizontally polarized light.

25. The method of claim 23 wherein the third beamsplitter is oriented to preferentially sample horizontally polarized light.

26. The method of claim 1 which further comprises transforming the light beam before the step of separating from the light beam a first sample beam, and transforming the light beam after the step of separating from the light beam a second sample beam.

27. An apparatus for measuring the state of polarization of a light beam comprising in optical series a first beamsplitter to produce a first sample beam and to transmit the first remaining light beam, a retarder means to transform state of polarization of the first remaining light beam, a second beamsplitter to produce from the transformed light beam a second sample beam and to transmit the second remaining light beam, and a first detector to measure the intensity of the first sample beam, and a second detector to measure the intensity of the second sample beam, wherein the first and second beamsplitters and the retarder means are disposed such that the intensity of the first sample beam corresponds to one of the Poincare latitude and longitude, and the intensity of the second sample beam corresponds to the other one of the Poincare latitude and longitude.

28. The apparatus of claim 27 further comprising a third beamsplitter to produce a third sample beam, wherein the third beamsplitter is located before the first beamsplitter, between the first beamsplitter and the second beamsplitter, or after the second beamsplitter.

29. The apparatus of claim 28 wherein the intensity of the third sample beam is at a maximum or minimum when the light beam has a desired state of polarization.

30. An apparatus for measuring the state of polarization of a light beam comprising in optical series a first beamsplitter to produce a first sample beam and transmit the first remaining light beam, wherein the first beamsplitter is arranged to preferentially sample light having a first state of polarization and transmits at least 80 percent of the light having the first state of polarization and transmits substantially all of light polarized orthogonally to the first state of polarization, a second beamsplitter to produce from the first remaining beam a second sample beam and to transmit the second remaining light beam, wherein the second beamsplitter is arranged to preferentially sample light having a second state of polarization and transmits at least 80 percent of the light having the second state of polarization and transmits substantially all of the light polarized orthogonally to the second state of polarization, a first photodetector to measure the intensity of the first sample beam, a second photodetector to measure the intensity of the second sample beam, wherein the first and second beamsplitters are disposed such that the signal from the first photodetector varies linearly and monotonically as a function of the state of polarization of the input light along a first arc on the Poincare sphere and the signal from the second photodetector varies linearly and monotonically as a function of the state of polarization of the input light along a second arc on the Poincare sphere, and the first and second arcs are substantially orthogonal.

31. The apparatus of claim 30 further comprising a third beamsplitter located before the first beamsplitter, between the first and second beamsplitters, or after the second beamsplitter, to produce a third sample beam, and a third photodetector to measure the intensity of the third sample beam.

32. The apparatus of claim 31 further comprising a circuit for adding the signals from two of the photodetectors to form a brightness signal that varies linearly with the intensity of the light beam and is substantially independent of the state of polarization of the light beam.

33. A method of sensing the state of polarization of a light beam comprising separating from the light beam a first sample beam and transmitting the first remaining light beam,
separating from the first remaining light beam a second sample beam and transmitting the second remaining light beam, and
measuring the intensity of the first sample beam, and measuring the intensity of the second sample beam,
wherein the separation of the first sample beam is performed to preferentially sample light having a first linear polarization and the separation of the second sample beam is performed to preferentially sample light having a second linear polarization,
wherein the first and second separation each transmit in excess of 80 percent of the light having the polarization that is preferentially sampled, and each separation transmits substantially all of the light having the orthogonal polarization, and
wherein the first and second separations are performed such that the intensity of the first sample beam varies linearly and monotonically as a function of the state of polarization of the light beam along a first arc on the Poincare sphere and the intensity of the second sample beam varies linearly and monotonically as a function of the state of polarization of the light beam along a second arc on the Poincare sphere and the two arcs are substantially orthogonal.

34. The method of 33 further comprising the step of separating a third sample beam from one of the light beam, the first remaining light beam, and the second remaining light beam, and measuring the intensity of the third sample beam.

35. The method of 34 further comprising step of determining the relative intensity level of the light beam by summing the intensity measurements of two of the sample beams.

36. The method of 35 further comprising the step of dividing the intensity measurement of the first and second sample beams by the relative intensity of the light beam.

37. Apparatus to control the state of polarization of a beam of light, comprising a polarization sensor and a polarization modulator,
wherein the polarization modulator transforms the state of polarization of light passing therethrough and comprises a first adjustment means that adjusts the state of polarization of light along a first adjustment arc on the Poincare sphere according to a first control signal, and a second adjustment means that adjusts the state of polarization of light along a second adjustment arc on the Poincare sphere according to a second control signal,
wherein the polarization sensor comprises in optical series a first beamsplitter to produce a first sample beam and transmit the first remaining light beam,
a second beamsplitter to produce from the first remaining beam a second sample beam and to transmit the second remaining light beam,
a first photodetector to measure the intensity of the first sample beam,
a second photodetector to measure the intensity of the second sample beam,
wherein the first and second beamsplitters are disposed such that the measured intensity at the first photodetector varies linearly and monotonically as a function of the state of polarization of the input light along a first sensing arc on the Poincare sphere and the measured intensity at the second photodetector varies linearly and monotonically as a function of the state of polarization of the input light along a second sensing arc on the Poincare sphere which is substantially orthogonal to the first sensing arc, and
circuitry that derives the first and second control signals from the measured intensities at the first and second photodetectors.

38. The apparatus of 37 where the circuitry derives the first control signal from the intensity at the first photodetector and derives the second control signal from the intensity at the second photodetector.

39. The apparatus of 37 where the light beam passes in optical series through the polarization modulator and then through the polarization sensor.

40. The apparatus of 37 where the light beam passes in optical series through the polarization sensor and then through the polarization modulator.

41. The apparatus of 37 wherein the first and second adjustment means and the first and second beamsplitters are disposed such that the first sensing arc is parallel to one of the first adjustment arc and the second adjustment arc.

42. The apparatus of 37 further comprising
a third beamsplitter that produces a third sample beam,
a third photodetector to measure the intensity of the third sample beam, and
circuitry that sums the measurements of intensities from two of the photodetectors to produce a brightness signal that varies linearly with the intensity of the light beam but is independent of its state of polarization.

43. The apparatus of 42 further comprising a circuit that divides the measurement of intensity from the first and second photodetectors by the brightness signal.

44. A method of controlling the state of polarization of a light beam comprising the steps of modulating the polarization to create a transformed beam and measuring the state of polarization of one of the light beam and the transformed light beam;
where the modulation is achieved by
applying a first polarization transformation that alters the state of polarization along a first transformation arc on the Poincare sphere and then
applying a second polarization transformation that alters the state of polarization along a second transformation arc on the Poincare sphere;
where the measurement of state of polarization is achieved by
separating from the beam to be measured a first sample beam and transmitting the first remaining light beam,
separating from the first remaining light beam a second sample beam and transmitting the second remaining light beam,
measuring the intensity of the first sample beam, and measuring the intensity of the second sample beam;
and the state of polarization is controlled by
adjusting the first and second polarization transformations according to the measurement of the intensity of the first and second sample beams.

45. The method of 44, wherein the separation of the first sample beam is done so its intensity varies linearly and monotonically as a function of the state of polarization being measured along a first sensing arc on the Poincare sphere, and the separation of the second sample beam is done so its intensity varies linearly and monotonically as a function of the state of polarization being measured along a second sensing arc on the Poincare sphere.

46. The method of 44 wherein the beam whose state of polarization is measured is the light beam before it encounters the polarization modulator, and the adjustment of the first and second polarization transformations is done using feedforward techniques.

47. The method of 44 wherein the beam whose state of polarization is measured is the light beam after being transformed by the polarization modulator, and the adjustment of the first and second polarization transformations is done using feedback techniques.

48. The method of 44 wherein the adjustment of the first polarization transformation is done according to the measurement of the intensity of one of the first and second sample beams and the adjustment of the second polarization transformation is done according to the measurement of the intensity of the other one of the first and second sample beams.

49. The method of 44 further comprising the steps of producing a desired state of polarization as the state of polarization in the light beam varies over a latitude or longitude range that exceeds 2 on the Poincare sphere by identifying when the alteration to the state of polarization along the first or second transformation arc has attained a predetermined limit and performing a reset when this occurs, where the reset comprises the steps of performing a third polarization transformation along a third polarization transformation arc so that the combined effect of the first, second, and third polarization transformations is to produce an overall polarization transformation, and adjusting the first or second polarization transformation which attained the predetermined limit so that it is no longer at the predetermined limit.

50. The method of 44 further comprising adjusting two of the first, second, and third polarization transformations during the reset step based on the measured intensities of the first and second sample beams.

51. The method of 50 wherein the beam whose state of polarization is measured is the light beam after being transformed by the polarization modulator, and the adjustment of the first and second polarization transformations is done using feedback techniques.

52. A method of sensing the state of polarization of a light beam comprising separating from the light beam a first sample beam and transmitting the first remaining light beam, separating from the first remaining light beam a second sample beam and transmitting the second remaining light beam, and measuring the intensity of the first sample beam, and measuring the intensity of the second sample beam, wherein the separation and measurement of the first sample beam is performed to preferentially measure light having a first linear polarization and the separation and measurement of the second sample beam is performed to preferentially measure light having a second linear polarization, wherein the separation of the first and second sample beams is performed such that the intensity of the first sample beam varies linearly and monotonically as a function of the state of polarization of the light beam along a first arc on the Poincare sphere and the intensity of the second sample beam varies linearly and monotonically as a function of the state of polarization of the light beam along a second arc on the Poincare sphere and the two arcs are substantially orthogonal.

53. The method of 52 further comprising the step of passing one of the first sample beam and the second sample beam through a polarization sensitive element between the point of sampling and the point of measurement.

* * * * *